C. W. PENFIELD.
Nut-Locks.
No. 152,249.
Patented June 23, 1874.
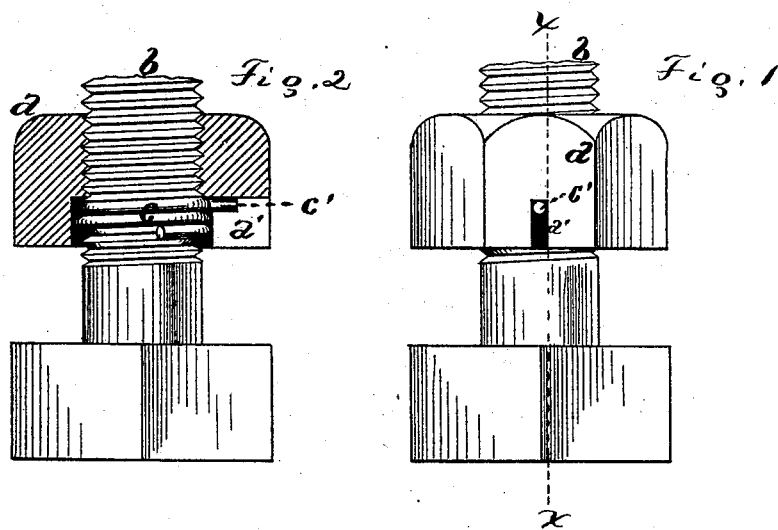

UNITED STATES PATENT OFFICE.

CHARLES W. PENFIELD, OF NEW BRITAIN, ASSIGNOR OF ONE-HALF HIS RIGHT TO WILLIAM E. SIMONDS, OF HARTFORD, CONNECTICUT.

IMPROVEMENT IN NUT-LOCKS.

Specification forming part of Letters Patent No. 152,249, dated June 23, 1874; application filed March 24, 1874.

*To all whom it may concern:*

Be it known that I, CHARLES W. PENFIELD, of New Britain, in the county of Hartford and State of Connecticut, have invented certain new and useful Improvements pertaining to Nut-Locks, of which the following is a specification, reference being had to the accompanying drawings, where—

Figure 1 is a view of a nut and bolt, embodying my said improvements. Fig. 2 is a view of the same, with the nut cut in transverse vertical section on the plane indicated by the dotted line $x$ $x$, Fig. 1.

The invention consists in the combination of a screw-threaded bolt, a short coil of a spiral spring fitted to run upon the thread of the bolt and a nut, in such manner that while the nut can be readily run upon or down the thread the spiral spring will not permit the nut to be turned back or run off the thread.

The letter $a$ indicates a screw-threaded bolt; $b$, a nut, with a chamber in its under or bottom side to hold or contain the spiral spring $c$, which, to give its most efficient action, should embrace the bolt a little tightly. Two or three coils of spring are sufficient for the purposes of this device. That end of the spring which may, perhaps, be appropriately termed the rear end is turned outward so as to form a projecting tang or finger, $c'$, and this finger or tang lies in the slot $a'$, made in the side of the chamber in the nut, which contains the spring, so that the spring and the nut must turn upon the bolt-thread together. It is a fact that the spring and nut thus turning together will readily run upon the thread of the bolt, but will not by the exertion of any reasonable force run back or off the thread; and the reason is this: The application of the moving power at the rear end of the spring tends to expand the diameter of the coil, and thus make the spring loose upon the bolt. This, when the power is applied in the proper direction to turn the spring upon or down the thread, but the application of power at this end of the spring to turn the spring in the opposite direction and off the bolt, tends to make the coil lessen in diameter, and thus tighten upon the bolt.

It is obvious that the spring can be used upon the top or bottom of the nut or within its body, though I prefer that it be used in a chamber in the under side of the nut for the purpose of protecting it from the weather, from accidents, and from being tampered with. To turn the nut and spring off the bolt, when this is necessary, it is only requisite to give the nut a turn backward with force enough to bend down the tang $c'$, when the hold of the spring upon the bolt will be loosened, and it will follow the nut off the thread; or a proper hole can be formed in the side of the nut, and a wrench used, having a finger to take hold of or bear upon the front end of the spring.

I claim, broadly, as my invention—

The combination of the screw-threaded bolt, the nut, and the spiral spring running upon the thread of the bolt and adapted to holding the nut from turning backward or off the bolt, substantially as shown and described.

CHARLES W. PENFIELD.

Witnesses:
WM. EDGAR SIMONDS,
JOHN P. CONNELL.